May 29, 1934.  C. R. BAILEY  1,960,364
ANTIFRICTION BEARING FOR CASINGS
Filed July 8, 1930  2 Sheets-Sheet 1
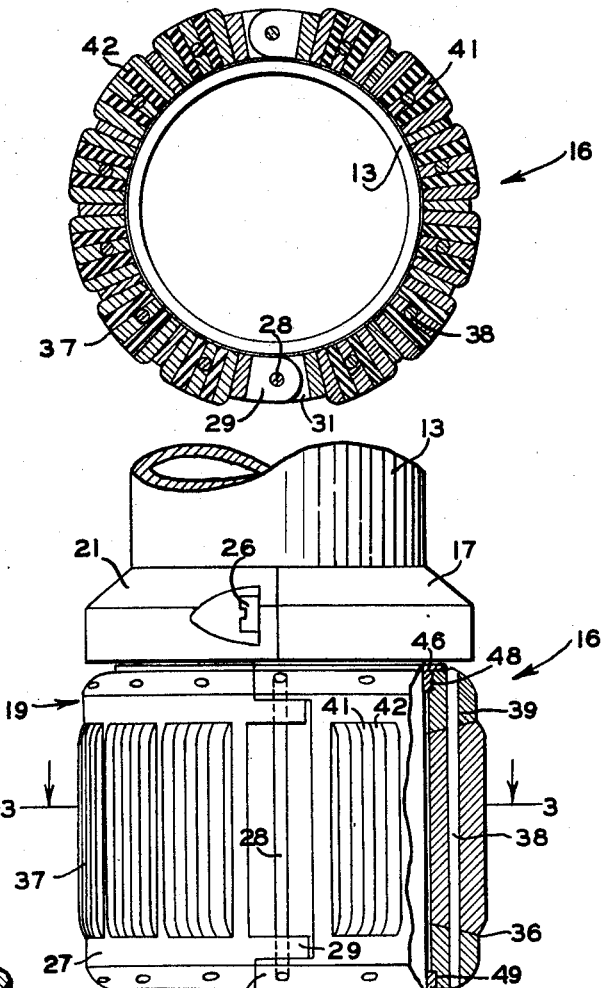
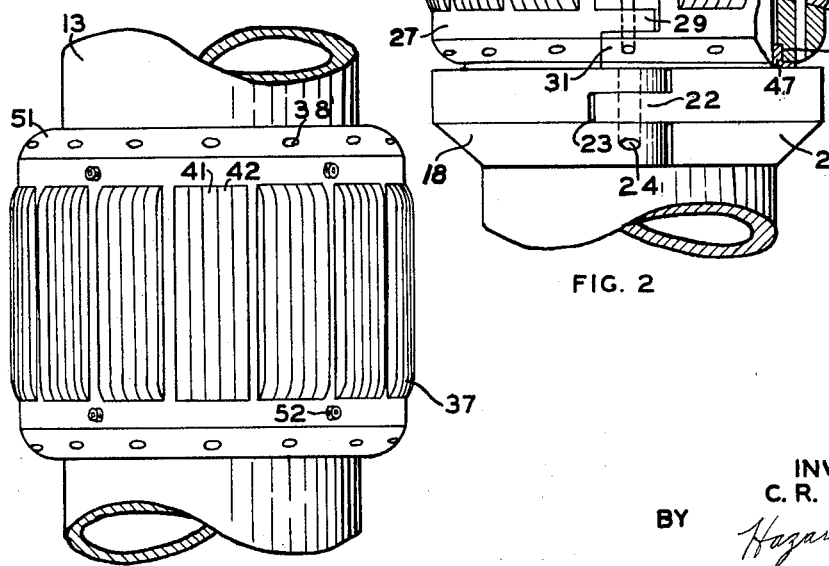
INVENTOR
C. R. BAILEY
BY
ATTORNEYS May 29, 1934.     C. R. BAILEY     1,960,364
ANTIFRICTION BEARING FOR CASINGS
Filed July 8, 1930     2 Sheets-Sheet 2
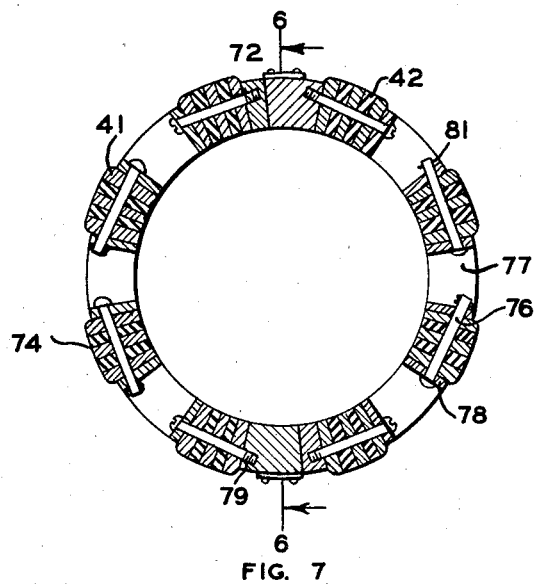
FIG. 7
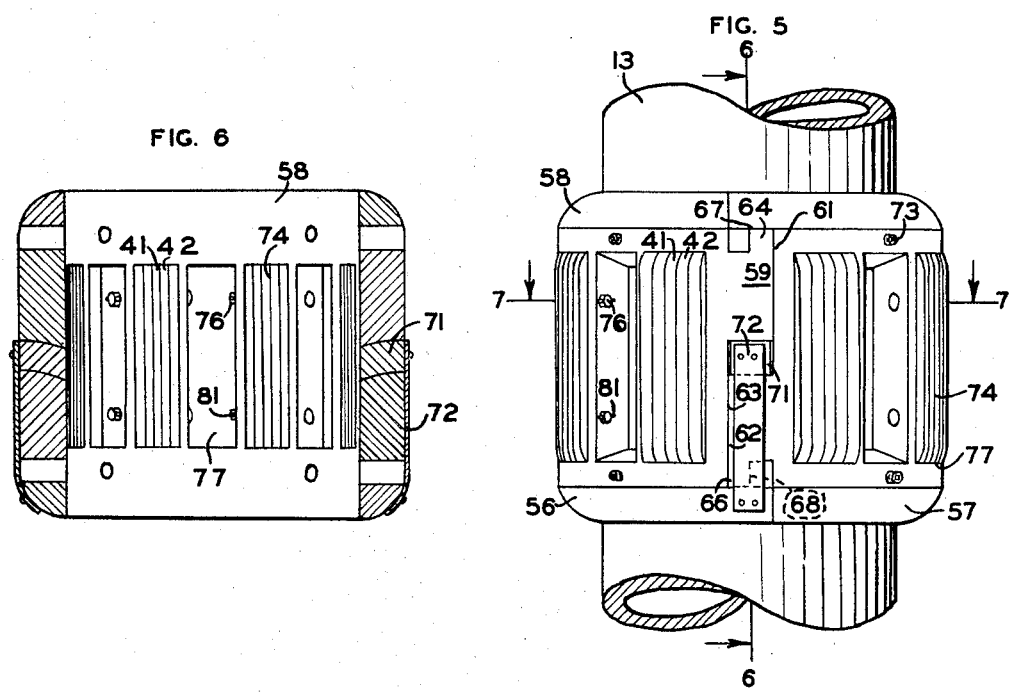
FIG. 6
FIG. 5
INVENTOR
C. R. BAILEY
BY Hazard and Miller
ATTORNEYS Patented May 29, 1934

1,960,364

UNITED STATES PATENT OFFICE 1,960,364

ANTIFRICTION BEARING FOR CASINGS

Clarence R. Bailey, Los Angeles, Calif., assignor to Carol Supplies, Inc., Los Angeles, Calif., a corporation of Arizona Application July 8, 1930, Serial No. 466,494

5 Claims. (Cl. 308—4)

This invention relates to antifriction bearings, and has for an object the provision of an antifriction bearing which represents an improvement over those of my copending application, Serial No. 330,495, filed January 5, 1929.

A more detailed object is to provide an antifriction bearing in the form of a head revolubly disposed upon an element such as a drill stem or sucker rod movably disposed within another element such as a well casing, this revoluble head being provided with a novel antifriction means in the form of slips rigidly but removably secured thereto in position to engage the inner surface of the casing or analogous element during movement thereinside of the element upon which the head is mounted.

A further object is to provide a novel antifriction material which may be employed in the construction of antifriction elements of various types, this material being possessed of an unusually high degree of efficiency in resisting wear resulting from friction.

A further object of the present invention is to provide an antifriction element adapted to be interposed between a well casing and the pump tubing which is suspended thereinside upon completion of the drilling of the well, and which serves as the conduit through which the fluid is pumped from the bottom of the well.

The invention possesses other objects and advantageous features, some of which, with those enumerated, will be set forth in the following description of the invention's particular embodiments which are illustrated in the drawings accompanying and forming a part of the specification.

Referring to the drawings:

Figure 1 is a vertical, medial sectional view taken through a section of well casing and the associated portion of the pump tubing, and showing in vertical section an antifriction bearing of my invention operatively installed in connection therewith.

Fig. 2 is an enlarged view in side elevation, of the antifriction bearing. A portion of the figure is broken away and shown in section to better disclose the nature of the invention.

Fig. 3 is a transverse, horizontal sectional view taken upon the line 3—3 of Fig. 2, with the direction of view as indicated.

Fig. 4 is a view similar to Fig. 2, but showing a slightly modified form of antifriction bearing.

Fig. 5 is a view similar to Figs. 2 and 4, but showing a still further modified form.

Fig. 6 is a vertical, medial sectional view, the plane of section being indicated by the line 6—6 of Fig. 5, and the direction of view by the arrows.

Fig. 7 is a horizontal sectional view taken upon the line 7—7 of Fig. 5, with the direction of view as indicated.

It is customary practice to employ a pump casing suspended inside a well casing, as means for confining the column of oil or other liquid being pumped from the bottom of a well, and conducting the fluid to a suitable point of discharge. The sucker rod of the pumping mechanism usually operates by reciprocating inside the pump casing, and inasmuch as the pump chamber is usually supported at the lower end of the tubing, reciprocation of the sucker rod within the tubing will result in the imposition of such stresses upon the tubing that it will tend to move with the sucker rod. Particularly true is this in the case of deep wells where, in some instances, the tubing must be several thousand feet in length. So great are the stresses imposed under such circumstances, that the tubing is stretched substantially one foot for each thousand feet of length, i.e., the lower end of pump tubing measuring 4,000 ft. in length, will move approximately four feet during the up and down reciprocation of the sucker rod. Obviously, this movement of the pump tubing within the well casing is conducive to wear therebetween, which tends to wear through either or both the casing and tubing. Owing to the practical impossibility of drilling a deep well with a perfectly straight bore, the tubing will bear against the casing at usually several points between the upper and lower ends thereof, these points being at or adjacent the points at which deflections in the bore of the well occur.

It is for the purpose of eliminating the wear which takes place as a result of the above described conditions, that the device of the present invention has been developed. Fig. 1 shows a portion of a length of well casing 11 installed in the usual manner within the bore 12 of a well. Inside the casing 11, pump tubing 13 is suspended. Although in the figure the tubing 13 is shown axially disposed with respect to the casing 11, it should be understood that the tubing 13 is usually supported at or adjacent its upper end only, with the result that it is free throughout the remainder of its length, to come into contact with the inside surface of the casing 11, wherever such deflections occur in the bore 12 that the casing 11 is bent far enough from true vertical to permit of such engagement. A sucker rod 14 is shown disposed inside the pump tubing 13, it being understood that the pump plunger is secured at the lower end of the sucker rod 14 which is reciprocated in an axial direction by means pumping mechanism disposed at the top of the well.

An antifriction bearing 16 is mounted upon the exterior of the pump tubing 13. A plurality of the bearings 16 may be installed upon the tubing 13 at spaced intervals throughout the length of the tubing, or the tubing 13 may be withdrawn from the casing 11 after it has been in use for a sufficient period to develop markings upon the exterior surface of the tubing wherever friction occurs between it and the casing 11, thus making it possible to install one of the bearings 16 at each point where such wear is observed to have occurred, and obviating the necessity of installing several bearings 16 in such positions that they will not come into engagement with the casing 11 during reciprocation of those portions of the tubing 13 upon which they are mounted.

Figs. 2 and 3 show the antifriction bearing 16 in enlarged form. It comprises a pair of spaced collars 17 and 18 adapted to be rigidly mounted in spaced relationship upon the exterior surface of the tubing 13, and a head 19 revolubly disposed upon the tubing 13 between the collars 17 and 18.

Each collar 17, 18 comprises a pair of arcuate, preferably semicircular sections 21. A tongue 22 formed on one end of one of the sections 21, extends into a complementary slot 23 in the associated end of the other section 21, and a pin 24 extending through that end of the slotted section as well as through the tongue 22, pivotally joins the two sections. The other ends of the sections 21 are adapted to be rigidly but separably connected by means of a screw 26 passing through a suitable clearance hole (not shown) in one of the sections 21 and threaded into the other section. These sections are so proportioned that when the screw 26 is tightened, the assembled collar 17, 18 will be clamped tightly against the tubing 13, as will readily be understood. When positioning the collars 17 and 18 upon the tubing 13, they should be so spaced that the head 19 may be mounted therebetween with sufficient clearance to permit free rotation of the head 19 about the tubing 13.

The head 19 is similarly constructed of arcuate sections 27. These sections, which preferably are semicircular in configuration, are adapted to be releasably joined by means of suitable pins 28 extending through aligned holes in tongues 29 and 31 formed at the ends of the sections. The pins 28 may be retained in proper position with respect to the tongues 29 and 31 by any suitable means, but the most convenient method is to rely upon the fact that the collars 17 and 18 extend radially outwards from the tubing 13 beyond the axial lines of the pins 28, thus preventing removal of the pins 28 without first removing one of the collars 17 or 18.

The sections 27 of the head 19 are slightly larger than the sections 21 of the collars 17 and 18, with the result that when the sections 27 are joined as hereinabove described, the inside diameter of the assembled head 19 will be slightly greater than the outside diameter of the tubing 13, thus permitting free rotation of the head 19 about the tubing, as will readily be understood.

In each of the arcuate sections 27 of the head 19, a plurality of apertures 36 are formed, these apertures being at preferably regularly spaced intervals throughout the arcuate surface of the section. Antifriction slips 37 are mounted upon the head 19 by disposing one of these slips in each of the apertures 36. These slips are of such shape and size that their outer surfaces project beyond the outer circumferential surface of the associated section 27, as well as beyond the outer edges of the collars 17 and 18, with the result that the only portions of the antifriction bearing which are permitted to come into engagement with the inner surface of the casing 11, are the outer surfaces of the antifriction slips 37. Each slip 37 is firmly but releasably retained within its associated aperture 36 by means of a pin 38 extending preferably longitudinally through the slip 37 and through aligned holes 39 in the collar section 27 at opposite ends of the aperture 36 within which the slip 37 is mounted. Obviously, the pins 38 which retain the slips 37 within their respective apertures 36, may be retained in proper position in the same manner as that in which the pins 28 are retained.

I also contemplate the provision of a novel material of which the slips 37 may be constructed, so as to yield an antifriction bearing in which the friction elements are capable of operating with a high degree of efficiency in resisting wear resulting from a large amount of friction, even in the presence of abrading substances such as the sand which is usually held in suspension in the fluids encountered within an oil well. This material is also chemically inert so that it is capable of resisting the action of various chemicals which would otherwise seriously hamper the satisfactory operation of the friction device over a prolonged period of time.

Each of the slips 37 is composed of alternate layers 41, 42 of hard and resilient or pliant material respectively. For example, the hard layers 41 may be hard, vulcanized rubber or a condensation product of formaldehyde and phenol or cresol, such as "Bakelite." I prefer to employ relatively soft but vulcanized rubber as the material of which the other strata 42 are formed, owing to the inert characteristics of this material and its capability of operating as an antifriction material in the presence of water and other liquids.

An antifriction slip constructed of these materials and in the manner indicated, has been found by experimentation, to be unusually effective. The hard or rigid layers 41 give body to the slip 37 so that it is of definite form and of sufficient strength to withstand the relatively heavy stresses to which it is subjected under normal conditions of use. In other words, the rigid strata 41 serve to support the softer strata 42 which, in reality, provide the antifriction means owing to the well-konwn tendency of relatively soft rubber to eliminate friction in the presence of a lubricating medium such as water or oil. It has also been found that even when the lubricating medium contains a relatively high content of sand or other highly abrading substance in suspension, it has little effect upon an antifriction element composed of relatively soft rubber. Even though the extreme outer edges of the rigid layers 41 may be worn away by the sand in suspension, it will be only to a relatively slight depth, with the result that the rigid layers 41 will still be capable of imparting the necessary support to the softer layers 42, only the extreme outer edges of which extend beyond the outer edges of the rigid layers 41.

Inasmuch as the head 19 is mounted for free rotation with respect to the tubing 13 and the collars 17 and 18, I also prefer to provide antifriction means between the head 19 and the other elements. For this purpose washers 46 and 47 are interposed between the upper and lower collars 17 and 18 respectively, and the associated ends of the head 19. Each washer 46, 47 is provided with an annular flange, 48, 49 respectively, which extends into the space between the head 19 and the tubing 13. The washers 46 and 47 and their associated flanges, are preferably composed of material similar to that of which the slips 37 are formed, with the result that they are capable of operating for a prolonged period of time toward the elimination of friction between the movable head 19 and the collars which are stationary upon the tubing 13. The washers 46 and 47 prevent friction between the head 19 and the collars; and their flanges prevent wear between the head and the tubing.

Fig. 4 shows a slightly modified form of antifriction bearing. Here the head 51, instead of being revoluble upon the tubing 13, is rigid therewith, being mounted thereupon through the expedient of a plurality of set screws 52 threaded through the head 51 at spaced intervals, so that they may be tightened against the exterior surface of the tubing 13. Obviously, this does away with the necessity for employing collars to retain the head 51 against axial movement with respect to the tubing 13. The head 51 may be constructed as a rigid, annular member, or of a plurality of sections releasably joined, and is provided with a plurality of slips 37 similar to those previously described and mounted upon the head 51 in a similar manner. Owing to the absence of the collars 17 and 18 however, each of the pins 38' whereby the slips 37 are retained, should be riveted or otherwise firmly secured to the head 51, to prevent the pins 38 from dropping out of the head during operation of the device.

Figs. 5, 6, and 7, show a still further modified form, the principal point of differentiation of which, from the first described modification, is in the manner of releasably joining the sections 56 and 57 of the head 58 whereon the slips are mounted. It is desirable to form the head of the antifriction bearing, of a plurality of releasable sections, so as to permit installing the antifriction bearing upon the tubing 13 without having to slip the head over an end thereof. Each of the sections 56, 57 is arcuate and preferably semicircular in configuration. A tongue 59 extends from one end of each of these sections as a circumferential continuation thereof, and is adapted to be received within a recess 61 in the associated end of the other section. The recess 61 is materially wider than the tongue 59, and is nearer one end of the collar 58, to permit the provision of another tongue 62 similar to the tongue 59, but extending from the other head section and receivable within another recess 63 which is similar to the recess 61, but which is formed in the head section on which the first mentioned tongue 59 is formed. This permits both tongues 59 and 62 to be extended into the opposed recesses 61 and 63 respectively, to bring lateral extensions 64 and 66 which are formed on the tongues 59 and 62 respectively, into register with sockets 67 and 68 respectively, which extend laterally from the recesses 61 and 63 respectively. As soon as the extensions 64 and 66 have thus been brought into registration with the sockets 67 and 68 respectively, the collar sections 56 and 57 should be moved with respect to each other and in a direction parallel to the axis of the tubing 13, so as to seat the extensions 64 and 66 within their respective sockets 67 and 68, thus preventing separation of the sections 56 and 57 by moving apart from each other in a radial direction.

A block 71 is carried at the outer end of a leaf spring 72, the other end of which is riveted or otherwise firmly attached to one of the collar sections. One of these blocks 71 is provided in this manner, upon each of the sections 56 and 57; and each block 71 is of sufficient thickness to permit its being received between the tongues 59 and 62 after their extensions 64 and 66 have been engaged within the sockets 67 and 68, thereby preventing withdrawal of the extensions from the sockets and securely but releasably locking the head sections 56 and 57 in assembled annular relationship.

When it is desired to disassemble the head 58, the blocks 71 may be withdrawn by bending their associated leaf springs 72 outwards. This will permit movement of one of the sections 56 with respect to the other section 57, to displace the extensions 64 and 66 from the sockets 67 and 68, whereupon the sections 56 and 57 may be separated radially.

Obviously, the head 58 of the last described modification, may be mounted either rigidly or revolubly upon the tubing 13, whereas Fig. 5 shows the head 58 rigidly mounted upon the tubing 13 as by a plurality of set screws 73. It should be understood that the set screws 73 may be eliminated, and spaced collars such as the collars 17 and 18, employed to retain the head 58 against axial movement upon the tubing 13, but to permit free rotation of the head with respect thereto.

The head 58 is provided in substantially the same manner as in the case of the previously described heads with antifriction slips 74 which are in all respects, similar to the slips 37 previously described, with the possible exception that horizontally extending pins 76 may be employed to retain the slips 74 in their respective holes 77, instead of the vertically extending pins 38. A disadvantage of this construction, lies in the fact that it is necessary to leave each alternate hole 77 vacant so as to permit the insertion of the pins 76 through the webs 78 defining the holes 77. The pins 76 may be either threaded to the webs 78 as indicated at 79, or they may be releasably retained in proper position through the expedient of cotter pins 81.

It is to be understood that the details of the invention as herein disclosed, are subject to alteration within the spirit or scope of the appended claims.

I claim:

1. In a bearing for a column movably disposed within a casing, a pair of collars, each comprising a plurality of arcuate sections, and means for securing said sections together in annular form encircling and rigid with said column, an annular head comprising a plurality of arcuate sections, and means for securing said sections together in annular form encircling said column between said collars, a plurality of antifriction slips mounted on said head, means for releasably locking said slips to said head and an antifriction washer interposed between said head and each of said collars, each of said washers having a flange extending between said head and said column.

2. In a bearing, an annular head comprising a plurality of arcuate sections, a tongue extending from one end of each of said sections and receivable within a recess in an end of another section, said recess being wider than said tongue, a lateral extension on said tongue receivable within a socket extending laterally from said recess, and locking means removably receivable within said recess between a side thereof and said tongue subsequent to insertion of said extension into said socket.

3. In an antifriction bearing, an annular head comprising a plurality of arcuate sections, a tongue extending from one end of each of said sections and receivable within a recess in an end of another section, said recess being wider than said tongue, a lateral extension on said tongue receivable within a socket extending laterally from said recess, a leaf spring secured to one of said sections, and a block carried by said spring, said block being receivable between a side of said recess and said tongue subsequent to insertion of said extension into said socket.

4. The combination of a casing, a column movably mounted therein and spaced from the walls of the casing, a bearing, means for mounting said bearing optionally at any point on the column, said head being provided with a plurality of openings, and anti-friction slips removably mounted in said openings of the head, the slips comprising alternate layers of rigid and pliant material and arranged radially and parallel to the axis of the column.

5. In combination with a rotary drill stem disposed within a casing, a plurality of anti-friction slips interposed between said drill stem and casing at circumferentially spaced intervals, each of said slips comprising alternate layers of rigid and pliant material, said layers being arranged radially and parallel to the axis of the drill stem.

CLARENCE R. BAILEY.